US012612548B2

(12) United States Patent
Sano et al.

(10) Patent No.: US 12,612,548 B2
(45) **Date of Patent: *Apr. 28, 2026**

(54) METHOD FOR PRODUCING INORGANIC FLUORIDE LUMINESCENT MATERIAL

(71) Applicant: NICHIA CORPORATION, Anan (JP)

(72) Inventors: Yohei Sano, Yokohama (JP); Hiroomi Taguchi, Yokohama (JP)

(73) Assignee: NICHIA CORPORATION, Anan-shi (JP)

( * ) Notice: Subject to any disclaimer, the term of this patent is extended or adjusted under 35 U.S.C. 154(b) by 788 days.

This patent is subject to a terminal disclaimer.

(21) Appl. No.: 18/000,275

(22) PCT Filed: May 20, 2021

(86) PCT No.: PCT/JP2021/019090

§ 371 (c)(1),
(2) Date: Nov. 29, 2022

(87) PCT Pub. No.: WO2021/241376

PCT Pub. Date: Dec. 2, 2021

(65) Prior Publication Data

US 2023/0220275 A1 Jul. 13, 2023

(30) Foreign Application Priority Data

May 29, 2020 (JP) ................................ 2020-094475

(51) Int. Cl.
*C09K 11/61* (2006.01)
*C01B 33/10* (2006.01)

(52) U.S. Cl.
CPC ........... *C09K 11/617* (2013.01); *C01B 33/10* (2013.01); *C01P 2002/54* (2013.01)

(58) Field of Classification Search
CPC ........ C09K 11/61–618; C09K 11/0866; C09K 11/626; C09K 11/632; C09K 11/644;
(Continued)

(56) References Cited

U.S. PATENT DOCUMENTS

| | | | |
|---|---|---|---|
| 6,039,894 | A | 3/2000 | Sanjurjo et al. |
| 8,906,724 | B2 | 12/2014 | Murphy et al. |

(Continued)

FOREIGN PATENT DOCUMENTS

| | | | |
|---|---|---|---|
| JP | H10316409 | A | 12/1998 |
| JP | 2004508215 | A | 3/2004 |

(Continued)

OTHER PUBLICATIONS

Final Office Action, United States Patent and Trademark Office, issued to U.S. Appl. No. 18/000,280 on Dec. 18, 2025, 17 pages.

(Continued)

*Primary Examiner* — Matthew E. Hoban
(74) *Attorney, Agent, or Firm* — Hunton Andrews Kurth LLP

(57) ABSTRACT

Provided is a method for producing an inorganic fluoride luminescent material having excellent light emission characteristics by using a non-aqueous hydrogen fluoride-containing liquid.

The method for producing an inorganic fluoride luminescent material includes: bringing a first inorganic fluoride luminescent material and a non-aqueous hydrogen fluoride-containing liquid having a hydrogen fluoride content in a range of 20% by mass or more and 100% by mass or less into contact with each other to obtain a non-aqueous solution containing ions derived from the first inorganic fluoride luminescent material, and bringing the non-aqueous solution and a non-aqueous organic liquid having a hydrogen fluoride (Continued)

content of less than 20% by mass into contact with each other to precipitate a second inorganic fluoride luminescent material.

10 Claims, 6 Drawing Sheets

(58) Field of Classification Search
CPC ... C09K 11/645; C09K 11/664; C09K 11/665; C09K 11/674; C09K 11/675; C09K 11/696; C09K 11/705; C09K 11/712; C09K 11/72; C09K 11/727; C09K 11/7428; C09K 11/7435; C09K 11/7755; C09K 11/7756; C09K 11/76; C09K 11/765; C09K 11/7719; C09K 11/772; C09K 11/7732; C09K 11/7733; C09K 11/7747; C09K 11/7748; C09K 11/7762; C09K 11/7763; C09K 11/7772; C09K 11/7773; C09K 11/779; C09K 11/7791; C09K 11/895; C01B 33/10
See application file for complete search history.

(56) References Cited

U.S. PATENT DOCUMENTS 8,974,696 B2 3/2015 Kaneyoshi et al.
9,564,558 B2 2/2017 Yoshida et al.
9,698,314 B2 7/2017 Murphy et al.
10,112,835 B2 10/2018 Yahata et al.
10,214,688 B2 2/2019 Yoshida et al.
2003/0032192 A1* 2/2003 Haubold ............ C09K 11/7792 423/311
2012/0256125 A1 10/2012 Kaneyoshi et al.
2014/0264418 A1 9/2014 Murphy et al.
2014/0327026 A1 11/2014 Murphy et al.
2015/0035430 A1 2/2015 Yoshida et al.
2016/0075557 A1 3/2016 Yahata et al.
2017/0088772 A1 3/2017 Yoshida et al.
2022/0186115 A1* 6/2022 Takatori ............... C09K 11/025

FOREIGN PATENT DOCUMENTS

JP 2009155130 A 7/2009
JP 2010209311 A 9/2010
JP 2012224536 A 11/2012
JP 2013030398 A 2/2013
JP 2013159718 A 8/2013
JP 2015013795 A 1/2015
JP 2015044973 A 3/2015
JP 2016517464 A 6/2016
JP 2019183130 A 10/2019
WO 2009119486 A1 10/2009

OTHER PUBLICATIONS

Non-Final Office Action, United States Patent and Trademark Office, issued to U.S. Appl. No. 18/000,280 on Jun. 18, 2025, 14 pages.

* cited by examiner

METHOD FOR PRODUCING INORGANIC FLUORIDE LUMINESCENT MATERIAL

CROSS-REFERENCE TO RELATED APPLICATION

This application is a national stage entry of International Application No. PCT/JP2021/019090, filed on May 20, 2021, which claims priority to Japanese Patent Application No. 2020-094475, filed on May 29, 2020, the disclosure of which is hereby incorporated by reference in its entirety.

TECHNICAL FIELD

The present invention relates to a method for producing an inorganic fluoride luminescent material.

BACKGROUND ART

Fluoride crystals have excellent permeability. Inorganic fluoride luminescent materials, in which rare earth metal elements are added to fluoride crystals, are used as fiber lasers, laser media for fiber amplifiers, and fluorescent materials that convert the wavelength of excitation light emitted from a light source. Fluorescent materials are used in light emitting devices for lighting, in-vehicles, and liquid crystal display backlighting, in combination with, for example, light emitting elements that emit light on the short wavelength side of the spectrum corresponding to visible light from ultraviolet light.

Examples of the fluorescent materials include fluoride fluorescent materials that emit red light. For example, Patent Literature 1 describes a method for obtaining an inorganic fluoride fluorescent material having a composition represented by $K_2SiF_6:Mn^{4+}$ in an aqueous solution containing hydrogen fluoride.

CITATION LIST

Patent Literature

Patent Literature 1: Japanese Unexamined Patent Publication No. 2012-224536

SUMMARY OF THE INVENTION

Problem to be Solved by the Invention

The optical characteristics of the inorganic fluoride luminescent materials are largely affected by hydroxide ions ($OH^-$) or water ($H_2O$) contained in the raw material. As described in, for example, Patent Literature 1, the optical characteristics of an inorganic fluoride fluorescent material produced using an aqueous solution may be affected by moisture (hydroxide ions ($OH^-$) or water) contained in the aqueous solution.

Accordingly, the present invention has an object to provide a method for producing an inorganic fluoride luminescent material having excellent light emission characteristics by using a non aqueous hydrogen fluoride containing liquid.

Means for Solving Problem

An aspect of the present invention relates to a method for producing an inorganic fluoride luminescent material including:

bringing a first inorganic fluoride luminescent material and a non aqueous hydrogen fluoride-containing liquid having a hydrogen fluoride content in a range of 20% by mass or more and 100% by mass or less into contact with each other to obtain a non-aqueous solution containing ions derived from the first inorganic fluoride luminescent material; and bringing the non-aqueous solution and a non-aqueous organic liquid having a hydrogen fluoride content of less than 20% by mass into contact with each other to precipitate a second inorganic fluoride luminescent material.

In accordance with the aspect of the present invention, a method for producing an inorganic fluoride luminescent material that is capable of obtaining an inorganic fluoride luminescent material having excellent light emission characteristics, can be provided.

MODE(S) FOR CARRYING OUT THE INVENTION

A method for producing an inorganic fluoride luminescent material according to the present invention will be hereunder described based on embodiments. The embodiments described below are exemplifications for embodying the technical idea of the present invention, and the present invention is not limited to the following inorganic fluoride luminescent material. The relationships between color names and chromaticity coordinates, and the relationships between wavelength ranges of light and color names of monochromic light are in accordance with Japanese Industrial Standard (JIS) Z8110.

Method for Producing Inorganic Fluoride Luminescent Material

The method for producing an inorganic fluoride luminescent material includes: bringing a first inorganic fluoride luminescent material and a non-aqueous hydrogen fluoride-containing liquid having a hydrogen fluoride content in a range of 20% by mass or more and 100% by mass or less into contact with each other to obtain a non-aqueous solution containing ions derived from the first inorganic fluoride luminescent material, and bringing the non-aqueous solution and a non-aqueous organic liquid having a hydrogen fluoride content of less than 20% by mass into contact with each other to precipitate a second inorganic fluoride luminescent material.

With the method for producing an inorganic fluoride luminescent material, an inorganic fluoride luminescent material can be produced using a non-aqueous hydrogen fluoride-containing liquid. With the production method of the present embodiment, the inorganic fluoride luminescent material is less affected by moisture (hydroxide ions ($OH^-$) or water) contained in the aqueous liquid, and the light emission characteristics may not be decreased by reducing the element, which is the luminescent center, contained in, for example, the inorganic fluoride luminescent material by hydroxide ions ($OH^-$) or water, thereby producing an inorganic fluoride luminescent material having excellent light emission characteristics.

Figure 1:
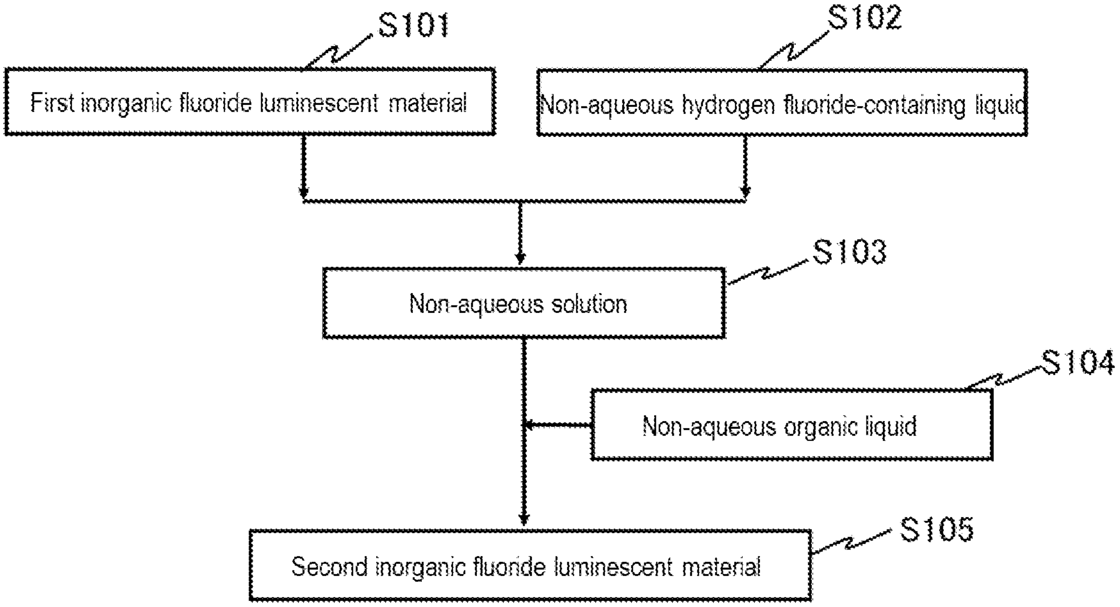
FIG. 1 is a flowchart showing a method for producing an inorganic fluoride luminescent material according to an embodiment.

FIG. 1 is a flowchart showing an example of the method for producing an inorganic fluoride luminescent material. The method for producing an inorganic fluoride luminescent material includes a step of preparing a first inorganic fluoride luminescent material (S101), a step of preparing a non-aqueous hydrogen fluoride-containing liquid having a hydrogen fluoride content in a range of 20% by mass or more and 100% by mass or less (S102), bringing the first inorganic fluoride luminescent material and the non-aqueous hydrogen fluoride-containing liquid into contact with each other to obtain a non-aqueous solution containing ions derived from the first inorganic fluoride luminescent material (S103), and bringing the non-aqueous solution and a non-aqueous organic liquid having a hydrogen fluoride content of less than 20% by mass into contact with each other to precipitate a second inorganic fluoride luminescent material (S105). The method for producing an inorganic fluoride luminescent material may include a step of preparing a non-aqueous organic liquid having a hydrogen fluoride content of less than 20% by mass (S104).

Step of Preparing First Inorganic Fluoride Luminescent Material

The first inorganic fluoride luminescent material is a first inorganic fluoride luminescent material having a composition containing: at least one A ion selected from the group consisting of $Li^+$, $Na^+$, $K^+$, $Rb^+$, $Cs^+$, and $NH_4^+$; at least one M element selected from the group consisting of Group 4 elements and Group 14 elements; and Mn, and is preferably an inorganic fluoride fluorescent material.

The first inorganic fluoride luminescent material preferably has a composition represented by the following formula (I-i). The first inorganic fluoride luminescent material is preferably an inorganic fluoride fluorescent material having a composition represented by the following formula (I-i).

$$A_x[M_{1-z}Mn^{4+}{}_zF_y] \quad \text{(I-i)}$$

wherein A represents at least one ion selected from the group consisting of $Li^+$, $Na^+$, $K^+$, $Rb^+$, $Cs^+$, and $NH_4^+$; M represents at least one element selected from the group consisting of Group 4 elements and Group 14 elements; x is an absolute value of an electric charge of the $[M_{1-z}Mn^{4+}{}_zF_y]$ ion; and y and z satisfy $5 \le y \le 7$ and $0<z<0.2$, respectively.

M is preferably at least one selected from the group consisting of Si, Ge, Ti, Zr, Hf, and Sn, more preferably at least one selected from the group consisting of Si, Ge, Ti, Zr, and Hf, and even more preferably at least one selected from the group consisting of Si, Ge, Ti, and Zr.

In the case where the first inorganic fluoride luminescent material is an inorganic fluoride fluorescent material having a composition represented by, for example, the formula (I-i), the first inorganic fluoride luminescent material may be produced by preparing a first aqueous solution containing hydrogen fluoride and a first fluoride complex ion containing tetravalent manganese ions, a second aqueous solution containing the A ions and hydrogen fluoride, and a third aqueous solution containing a second fluoride complex ion containing ions composed of the M element; and mixing the first aqueous solution, the second aqueous solution, and the third aqueous solution. For the method for producing the first inorganic fluoride luminescent material, for example, the method described in Japanese Unexamined Patent Publication No. 2015-044973 can be referred to.

Step of Preparing Non-Aqueous Hydrogen Fluoride-Containing Liquid Non-Aqueous Hydrogen Fluoride-Containing Liquid The non-aqueous hydrogen fluoride-containing liquid has a hydrogen fluoride content in a range of 20% by mass or more and 100% by mass or less. The non-aqueous hydrogen fluoride-containing liquid may contain hydrogen fluoride in an amount capable of dissolving the first inorganic fluoride luminescent material. The first inorganic fluoride luminescent material in contact with the non-aqueous hydrogen fluoride-containing liquid dissolves, and ions derived from the first inorganic fluoride luminescent material are contained in the non-aqueous solution. In the case where the first inorganic fluoride luminescent material is an inorganic fluoride fluorescent material, when the first inorganic fluoride luminescent material and the non-aqueous hydrogen fluoride-containing liquid are brought into contact with each other, A ions derived from the first inorganic fluoride luminescent material, Mn ions, ions containing the M element, and ions containing fluorine are contained in the non-aqueous solution. The ions derived from the first inorganic fluoride luminescent material contained in the non-aqueous solution may be complex ions derived from the first inorganic fluoride luminescent material. The content of hydrogen fluoride in the non-aqueous hydrogen fluoride-containing liquid in which the first inorganic fluoride luminescent material can be dissolved as ions is in a range of 20% by mass or more and 100% by mass or less. The non-aqueous hydrogen fluoride-containing liquid may be 100% by mass of liquid hydrogen fluoride under standard conditions (25° C., 1 atm). The content of hydrogen fluoride in the non-aqueous hydrogen fluoride-containing liquid may be in a range of 20% by mass or more and 80% by mass or less, may be in a range of 30% by mass or more and 60% by mass or less, may be in a range of 20% by mass or more and 30% by mass or less, and may be in a range of 60% by mass or more and 80% by mass or less.

The non-aqueous hydrogen fluoride-containing liquid may contain a compound that is a liquid under standard conditions (25° C., 1 atm) and has a boiling point of 120° C. or higher, in addition to hydrogen fluoride. The non-aqueous hydrogen fluoride-containing liquid may contain at least one selected from the group consisting of nitrogen-containing heterocyclic compounds, amines, ureas, amides, carbamic acids, trialkylphosphines, ethers, esters, alcohols, and quaternary ammonium salts. The compound contained in the non-aqueous hydrogen fluoride-containing liquid may be at least one selected from the group consisting of nitrogen-containing heterocyclic compounds, amines, ureas, amides, carbamic acids, trialkylphosphines, ethers, esters, alcohols, and quaternary ammonium salts. Examples of commercially available non-aqueous hydrogen fluoride-containing liquids include an OLAH reagent that is a pyridine-HF complex containing 70% by mass of hydrogen fluoride and pyridine. Examples of the non-aqueous hydrogen fluoride-containing liquid include a triethylamine-HF complex containing 28% by mass of hydrogen fluoride and triethylamine. In addition, examples of the non-aqueous hydrogen fluoride-containing liquid include a urea-HF complex containing 65% by mass to 75% by mass of hydrogen fluoride and urea, and a DMPU-HF complex containing 65% by mass of hydrogen fluoride and N,N'-dimethylpropylene urea.

Examples of the nitrogen-containing heterocyclic compounds include alicyclic compounds having a ring selected from pyrrolidine and piperidine; and heterocyclic aromatic compounds having a ring selected from pyrrole, pyrazole, imidazole, isoxazole, thiazole, thiadiazol, pyridine, pyridazine, pyrimidine, pyrazine, triazine, indole, benzimidazole, benzoxazole, benzothiazole, benzotriazole, purine, quinoline, isoquinoline, quinoxaline, quinazoline, acridine, and phenanthroline. The nitrogen-containing heterocyclic compounds may contain fluorine, chlorine, and bromine in the compounds.

Examples of the compound containing imidazole as the nitrogen-containing heterocyclic compound, and fluorine include an imidazolium salt represented by the following formula (1).

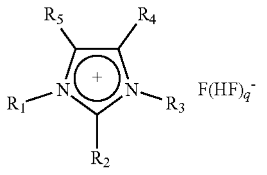

(1)

In the formula (1), $R_1$ and $R_3$ each independently represent an alkyl group having 1 to 4 carbon atoms; and $R_2$, $R_4$, and $R_5$ each independently represent a hydrogen atom or an alkyl group having 1 to 4 carbon atoms. A part or all of $R_1$ to $R_5$ may be mutually bonded to form a ring. Examples of the alkyl group having 1 to 4 carbon atoms include a methyl group, an ethyl group, an n-propyl group, an iso-propyl group, and an n-butyl group. $R_2$, $R_4$, and $R_5$ may include a hydrogen atom, a methyl group, or an ethyl group, or may include a hydrogen atom. In the formula (1), q represents a numerical value from 1 to 4, and may not necessarily be an integer. The numerical value of q can be calculated from the elemental analysis value of the compound.

Specific examples of the compound represented by formula (1) include 1,3-dimethylimidazolium salt, 1,3,4-trimethylimidazolium salt, and 1-ethyl-3-methylimidazolium salt; and 1-ethyl-3-methylimidazolium salt is a salt that melts at room temperature. In the formula (1), a part or all of $R_1$ to $R_5$ may be mutually bonded to form a ring. Specific examples thereof include 1,3-dimethylbenzimidazolium salt and 1-ethyl-3-methylbenzimidazolium salt.

Among the nitrogen-containing heterocyclic compounds containing fluorine, chlorine, or bromine, examples of the nitrogen-containing heterocyclic compound mainly containing chlorine or bromine include 2-trichloromethylpyrrole, 2-tribromomethylpyrrole, 4-chloro-3-trichloromethylpyrazole, 4-chloro-3,5-bis [trichloromethyl]pyrazole, 4-chloro-3-tribromomethylpyrazole, 4-chloro-3,5-bis [tribromomethyl]pyrazole, 1-methyl-3-trichloromethylpyrazole-4-carboxylate ethyl, 1,2-bis [trichloromethyl] imidazole, 1,3-bis [trichloromethyl]] imidazole, 1,5-bis [trichloromethyl] imidazole, 2,5-bis [trichloromethyl] imidazole, 4,5-bis [trichloromethyl] imidazole, 1,2,5-tris [trichloromethyl] imidazole, 2,3,4-tris [trichloromethyl] imidazole, 1,2-bis [tribromomethyl] imidazole, 1,3-bis [tribromomethyl] imidazole, 1,5-bis [tribromomethyl] imidazole, 2,5-bis [tribromomethyl] imidazole, 4,5-bis [tribromomethyl] imidazole, 1,2,5-tris [tribromomethyl] imidazole, 2,3,4-tris [tribromomethyl] imidazole, 2-trichloromethylpyridine, 3-trichloromethylpyridine, 4-trichloromethylpyridine, 2,3-2,5-bis [trichloromethyl]pyridine, 2,6-bis [trichloromethyl]pyridine, 3,5-bis [trichloromethyl]pyridine, 2-tribromomethylpyridine, 3-tribromomethylpyridine, 4-tribromomethylpyridine, 2,3-2,5-bis [tribromomethyl]pyridine, 2,6-bis [tribromomethyl]pyridine, 3,5-bis [tribromomethyl]pyridine, 3-trichloromethylpyridazine, 3-tribromomethylpyridazine, 4-trichloromethylpyridazine, 4-tribromomethylpyridazine, 2,4-bis [trichloromethyl] pyrimidine, 2,6-bis [trichloromethyl] pyrimidine, 2,4-bis [tribromomethyl] pyrimidine, 2,6-bis [tribromomethyl] pyrimidine, 2,4-dichloro-5-trichloromethylpyrimidine, 2-trichloromethylpyrazine, 2-tribromomethylpyrazine, 1,3,5-trisbis [trichloromethyl] triazine, 1,3,5-trisbis [tribromomethyl] triazine, 4-trichloromethylindole, 5-trichloromethylindole, 4-tribromomethylindole, 5-tribromomethylindole, 2-trichloromethylbenzimidazole, 2-tribromomethylbenzimidazole, 5-trichloromethyl-1H-benzotriazole, 5-tribromomethyl-1H-benzotriazole, 6-trichloromethylpurine, 6-tribromomethylpurine, 3-trichloromethylquinoline, 4-trichloromethylquinoline, 3-tribromomethylquinoline, 4-tribromomethylquinoline, 3-trichloromethylisoquinoline, 3-tribromomethylisoquinoline, 4-trichloromethyltinorin, 4-tribromomethyltinorin, 2-trichloromethylquinoxaline, 2-tribromomethylquinoxaline, 5-trichloromethylquinoxaline, 5-tribromomethylquinoxaline, 9-trichloromethylacridine, 9-tribromomethylacridine, 4-trichloromethyl-1,10-phenanthroline, 4-tribromomethyl-1,10-phenanthroline, 5-trichloromethyl-1,10-phenanthroline, and 5-tribromomethyl-1,10-phenanthroline.

Among the oxygen and nitrogen-containing heterocyclic compounds containing fluorine, chlorine, or bromine, examples of the oxygen and nitrogen-containing heterocyclic compound mainly containing chlorine or bromine include 3,5-bis [trichloromethyl] isoxazole, 3,5-bis [tribromomethyl] isoxazole, 2-trichloromethylbenzoxazole, and 2-tribromomethylbenzoxazole.

Among the sulfur and nitrogen-containing heterocyclic compounds containing fluorine, chlorine, or bromine, examples of the sulfur and nitrogen-containing heterocyclic compound mainly containing chlorine or bromine include 4,5-bis [trichloromethyl] thiazole, 4,5-bis [tribromomethyl] thiazole, 5-trichloromethyl-thiadiazole, 5-tribromomethyl-thiadiazole, 2-trichloromethylbenzothiazole, and 2-tribromomethylbenzothiazole.

Examples of the amines include methylamine, ethylamine, dimethylamine, diethylamine, trimethylamine, triethylamine, n-propylamine, isopropylamine, n-butylamine, dibutylamine, tributylamine, diethylenetriamine, monoethanolamine, triethanolamine, 1,2-propylenediamine, monoisopropanolamine, diisopropanolamine, triisopropanolamine, o-toluidine, p-nitrotoluene, N-(2-aminoethyl) ethanolamine, aniline, piperazine, and triethylenetetramine.

Examples of the ureas include urea, 1,1,3,3-tetramethylurea, 1,3-dimethyl-2-imidazolidinone, 1,3-diethyl-2-imidazolidinone, 1,3-di (n-propyl)-2-imidazolidinone, 1,3-di (n-butyl)-2-imidazolidinone, 1,3-dimethyl-3,4,5,6-tetrahydro-2 (1H)-pyrimidinone, N,N'-dimethylpropylurea, N,N'-diethylpropylurea, N,N'-di (n-propyl) propylurea, and N,N'-di (n-butyl) propylurea.

Examples of the amides include N,N'-dimethylformamide, N,N'-diethylformamide, N,N'-dimethylacetamide, and 1-methyl-2-pyrrolidone.

Examples of the carbamic acids include carbamic acid and ethyl carbamate.

Examples of the trialkylphosphines include hexamethylphosphoramide.

Examples of the ethers include n-butyl ether, n-hexyl ether, anisole, phenetole, butylphenyl ether, amylphenyl ether, methoxytoluene, benzylmethyl ether, diphenyl ether, dibenzyl ether, 1,2-diethoxyethane, 1,2-dibutoxyethane, diethylene glycol dimethyl ether, diethylene glycol diethyl ether, and diethylene glycol dibutyl ether.

Examples of the esters include n-butyl acetate, n'pentyl acetate, isopentyl acetate, cyclohexyl acetate, benzyl acetate, butyl propionate, isopentyl propionate, methyl benzoate, dimethyl phthalate, and y butyrolactone.

Examples of the alcohols include alcohols having a hydrocarbon group having 4 or more carbon atoms, such as 1-butanol, 2-methyl-1-propanol, 2-butanol, 2-methyl-2-propanol, butanol, 1-pentanol, 2-pentanol, 1-hexanol, 2-hexanol, 2-methyl-2-pentanol, 1-heptanol, 2-heptanol, 1-octanol, 1-nonanol, 1-decanol, 1-undecanol, and 1-dodecanol.

Examples of the quaternary ammonium salts include a quaternary ammonium salt represented by the following formula (2).

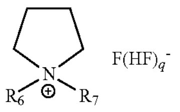

(2)

In the formula (2), $R_6$ represents an alkyl group having 1 to 4 carbon atoms; $R_7$ represents a methoxymethyl group, a methoxyethyl group, and an ethoxymethyl group; and q represents a numerical value from 1 to 4.

The quaternary ammonium salt represented by the formula (2) is composed of a quaternary ammonium cation and a fluorohydrogenate anion. Examples of $R_6$ in the quaternary ammonium cation include a linear or branched alkyl group having 1 to 4 carbon atoms. Specific examples thereof include a methyl group, an ethyl group, an n-propyl group, an iso-propyl group, an n-butyl group, an iso butyl group, and a tert-butyl group. Examples of $R_7$ in the quaternary ammonium cation include a methoxymethyl group, a methoxyethyl group, and an ethoxymethyl group. Examples of the fluorohydrogenate anion include a fluorohydrogenate anion represented by $F(HF)_q$, wherein q represents a numerical value from 1 to 4. Here, q may not necessarily be an integer; and is preferably a numerical value of 1.5 or more and 3 or less, and more preferably 2 or more and 2.5 or less.

Specific examples thereof include N-methoxymethyl-N-methylpyrrolidinium fluorohydrogenate, N-methoxymethyl-N-ethylpyrrolidinium fluorohydrogenate, N-methoxymethyl-N-n-propylpyrrolidinium fluorohydrogenate, N-methoxymethyl-N-iso-propylpyrrolidinium fluorohydrogenate, N-methoxymethyl-N-n-butylpyrrolidinium fluorohydrogenate, N-methoxymethyl-N-iso-butylpyrrolidinium fluorohydrogenate, N-methoxymethyl-N-tert-butylpyrrolidinium fluorohydrogenate, N-methoxyethyl-N-methylpyrrolidinium fluorohydrogenate, N-methoxyethyl-N-ethylpyrrolidinium fluorohydrogenate, N-methoxyethyl-N-n-propylpyrrolidinium fluorohydrogenate, N-methoxyethyl-N-iso-propylpyrrolidinium fluorohydrogenate, N-methoxyethyl-N-n-butylpyrrolidinium fluorohydrogenate, N-methoxyethyl-N-iso-butylpyrrolidinium fluorohydrogenate, N-methoxyethyl-N-tert-butylpyrrolidinium fluorohydrogenate, N-ethoxymethyl-N-methylpyrrolidinium fluorohydrogenate, N-ethoxymethyl-N-ethylpyrrolidinium fluorohydrogenate, N-ethoxymethyl-N-n-propylpyrrolidinium fluorohydrogenate, N-ethoxymethyl-N-iso-propylpyrrolidinium fluorohydrogenate, N-ethoxymethyl-N-n-butylpyrrolidinium fluorohydrogenate, N-ethoxymethyl-N-iso-butylpyrrolidinium fluorohydrogenate, and N-ethoxymethyl-N-tert-butylpyrrolidinium fluorohydrogenate.

Step of Obtaining Non-Aqueous Solution

The non-aqueous solution can be obtained by bringing the first inorganic fluoride luminescent material and the non-aqueous hydrogen fluoride-containing liquid into contact with each other. While stirring the non-aqueous hydrogen fluoride-containing liquid, the first inorganic fluoride luminescent material may be added thereinto to obtain a non-aqueous solution containing ions derived from the first inorganic fluoride luminescent material. By bringing the first inorganic fluoride luminescent material and the non-aqueous hydrogen fluoride-containing liquid into contact with each other to obtain a non-aqueous solution containing ions derived from the first inorganic fluoride luminescent material, hydroxide ions ($OH^-$) contained in the first inorganic fluoride luminescent material can be replaced with fluoride ions ($F^-$) to obtain a second inorganic fluoride luminescent material having excellent light emission characteristics, which is less affected by hydroxide ions ($OH^-$).

The concentration of the first inorganic fluoride luminescent material in the non-aqueous solution is preferably in a range of 0.01 g/mL or more and 1.0 g/mL or less, may be in a range of 0.03 g/mL or more and 0.8 g/mL or less, and may be in a range of 0.05 g/mL or more and 0.5 g/mL or less. When the concentration of the first inorganic fluoride luminescent material in the non-aqueous solution falls within the range of 0.01 g/mL or more and 1.0 g/mL or less, hydroxide ions ($OH^-$) contained in the first inorganic fluoride luminescent material can be replaced with fluoride ions ($F^-$) to obtain a second inorganic fluoride luminescent material containing no hydroxide ions ($OH^-$) or a reduced amount of hydroxide ions ($OH^-$).

Step of Preparing Non-Aqueous Organic Liquid

Non-Aqueous Organic Liquid

The non-aqueous organic liquid has a hydrogen fluoride content of less than 20% by mass. The content of hydrogen fluoride in the non-aqueous organic liquid may be an amount capable of precipitating a second inorganic fluoride luminescent material derived from the first inorganic fluoride luminescent material in a mixture of the non-aqueous solution and the non-aqueous organic liquid (hereinafter, also referred to as "non-aqueous liquid mixture"). The content of hydrogen fluoride in the non-aqueous organic liquid capable of precipitating a second inorganic fluoride luminescent material in the non-aqueous liquid mixture is less than 20% by mass. The content of hydrogen fluoride in the non-aqueous organic liquid may be 10% by mass or less, may be 5% by mass or less, may be 3% by mass or less, and may be 1% by mass or less; and the non-aqueous organic liquid may have a hydrogen fluoride content of 0% by mass, and may substantially contain no hydrogen fluoride. The non-aqueous organic liquid substantially containing no hydrogen fluoride refers to a non-aqueous organic liquid having a fluorine content of less than 1% by mass. The non-aqueous organic liquid contains at least one selected from the group consisting of nitriles, ketones, amines, amides, nitrogen-containing heterocyclic compounds, fluoro-compounds, ethers, esters, alcohols, and mixtures of these. The non-aqueous organic liquid may be at least one selected from the group consisting of nitriles, ketones, amines, amides, nitrogen-containing heterocyclic compounds, fluoro-compounds, ethers, esters, alcohols, and mixtures of these.

Examples of the nitriles include acetonitrile, propionitrile, benzonitrile, acrylonitrile, and methacrylonitrile.

Examples of the ketones include acetone, methyl ethyl ketone, methyl isobutyl ketone, diisobutyl ketone, and cyclohexanenone. Examples of the ketone-based compounds having a hydroxyl group (alcohol) as a functional group include diacetone alcohol.

Examples of the fluoro-compounds include 1,1,2,2-tetrafluoroethylene, 2,2,3,3-tetrafluoropropyl ether, perfluorocarbon, hydrochlorofluorocarbon, hydrofluorocarbon, and hydrofluoroether.

Examples of the amines, the amides, the nitrogen-containing heterocyclic compounds, the ethers, the esters, and the alcohols include compounds exemplified as the compounds used in the non-aqueous hydrogen fluoride-containing liquid, respectively. The amines, the amides, the nitrogen-containing heterocyclic compounds, the ethers, the esters, and the alcohols may be the same as or different from compounds used in the non-aqueous hydrogen fluoride-containing liquid, respectively.

Step of Precipitating Second Inorganic Fluoride Luminescent Material

In the step of precipitating a second inorganic fluoride luminescent material, the non-aqueous solution containing ions derived from the first inorganic fluoride luminescent material and the non-aqueous organic liquid are brought into contact with each other to precipitate a second inorganic fluoride luminescent material in the non-aqueous liquid mixture. For the contact between the non-aqueous solution and the non-aqueous organic liquid, while stirring the non-aqueous solution, the non-aqueous organic liquid may be dropped thereinto to precipitate a second inorganic fluoride luminescent material. The non-aqueous solution is preferably continuously stirred, and the non-aqueous organic liquid is preferably continuously dropped into the continuously stirred non-aqueous solution to precipitate a second inorganic fluoride luminescent material. By continuously stirring the non-aqueous solution containing ions derived from the first inorganic fluoride luminescent material and dropping the non-aqueous organic liquid thereinto, a second inorganic fluoride luminescent material can be precipitated. The contact between the non-aqueous solution and the non-aqueous organic liquid may be performed using a batch-type reactor.

In the step of precipitating a second inorganic fluoride luminescent material, the temperature of the non-aqueous solution containing ions derived from the first inorganic fluoride luminescent material is preferably in a range of 10° C. or higher and 40° C. or lower, and the temperature of the non-aqueous organic liquid is preferably in a range of 10° C. or higher and 40° C. or lower. When the temperature of the non-aqueous solution and the non-aqueous organic liquid falls within the range of 10° C. or higher and 40° C. or lower, organic impurities are reduced to attach to the second inorganic fluoride luminescent material to be precipitated, so that a purified second inorganic fluoride luminescent material can be easily precipitated. The temperature of the non-aqueous solution may be in a range of 15° C. or higher and 35° C. or lower, and may be approximately the same as room temperature. The temperature of the non-aqueous organic liquid may be in a range of 15° C. or higher and 35° C. or lower, and may be approximately the same as room temperature. The temperature difference between the temperature of the non-aqueous solution containing ions derived from the first inorganic fluoride luminescent material and the temperature of the non-aqueous organic liquid may be 30° C. or lower, may be 20° C. or lower, may be 10° C. or lower, and may be 0° C.

In the step of precipitating a second inorganic fluoride luminescent material, the volume ratio of the non-aqueous solution containing ions derived from the first inorganic fluoride luminescent material to the non-aqueous organic liquid (non-aqueous solution: non-aqueous organic liquid) is preferably in a range of 1:1 to 5:1, may be in a range of 1:1 to 4:1, and may be in a range of 1:1 to 3:1. When the volume of the non-aqueous solution falls within the range of 1 to 5 times the volume of the non-aqueous organic liquid, hydroxide ions ($OH^-$) contained in the first inorganic fluoride luminescent material can be replaced with fluoride ions to precipitate a purified second inorganic fluoride luminescent material.

In the step of precipitating a second inorganic fluoride luminescent material, when the non-aqueous organic liquid is dropped while continuously stirring the non-aqueous solution containing ions derived from the first inorganic fluoride luminescent material, the stirring speed of the non-aqueous solution is preferably in a range of 20 to 1,000 rpm, may be in a range of 30 to 800 rpm, may be in a range of 50 to 500 rpm, and may be in a range of 80 to 400 rpm. When the stirring speed of the non-aqueous solution falls within the range of 20 to 1,000 rpm, the non-aqueous solution and the non-aqueous organic liquid are in sufficient contact, and hydroxide ions ($OH^-$) contained in the first inorganic fluoride luminescent material can be replaced with fluoride ions to precipitate a purified second inorganic fluoride luminescent material. The method for stirring the non-aqueous liquid may be a method in which the concentration gradient of each component contained in the non-aqueous solution can be relaxed. Examples of the stirring method include a method of rotating a stirrer at a constant speed, a method of pressurizing a non-aqueous solution with a pump to generate a flow, and a method of using a mechanical stirrer.

In the step of precipitating a second inorganic fluoride luminescent material, the dropping speed of the non-aqueous organic liquid is preferably in a range of 0.1 mL/min or more and 10 mL/min or less, may be in a range of 0.5 mL/min or more and 8 mL/min or less, and may be in a range of 1 mL/min or more and 7 mL/min or less. When the dropping speed of the non-aqueous organic liquid to the non-aqueous solution containing ions derived from the first inorganic fluoride luminescent material falls within the range of 0.1 mL/min or more and 10 mL/min or less, the non-aqueous solution and the non-aqueous organic liquid are in sufficient contact, and hydroxide ions ($OH^-$) contained in the first inorganic fluoride luminescent material can be replaced with fluoride ions to precipitate a purified second inorganic fluoride luminescent material.

In the method for producing an inorganic fluoride luminescent material, the obtained second inorganic fluoride luminescent material may be subjected to post-treatments such as a separation treatment from the non-aqueous liquid mixture, a washing treatment, and a drying treatment. The washing treatment can be performed using a non-aqueous organic liquid. The drying treatment can be performed by an industrially commonly used device or method such as a vacuum dryer, a heat dryer, a conical dryer, and a rotary evaporator. The drying temperature in the heat-drying treatment may be a temperature at which the liquid attached to the second inorganic fluoride luminescent material evaporates; and is usually 40° C. or higher, preferably 50° C. or higher, and is usually 100° C. or lower, preferably 70° C. or lower. The drying time may be a time in which the liquid attached to the second inorganic fluoride luminescent material evaporates, and is, for example, approximately 8 hours.

Second Inorganic Fluoride Luminescent Material

The second inorganic fluoride luminescent material preferably has a composition represented by the following formula (I). The second inorganic fluoride luminescent material is preferably an inorganic fluoride fluorescent material having a composition represented by the following formula (I).

$$A_x[M_{1-z}Mn^{4+}{}_zF_y] \qquad (I)$$

wherein A represents at least one ion selected from the group consisting of $Li^+$, $Na^+$, $K^+$, $Rb^+$, $Cs^+$, and $NH_4^+$; M represents at least one element selected from the group consisting of Group 4 elements and Group 14 elements; x is an absolute value of an electric charge of the $[M_{1-z}Mn^{4+}{}_zF_y]$ ion; and y and z satisfy $5 \leq y \leq 7$ and $0<z<0.2$, respectively.

M is preferably at least one selected from the group consisting of Si, Ge, Ti, Zr, Hf, and Sn, more preferably at least one selected from the group consisting of Si, Ge, Ti, Zr, and Hf, and even more preferably at least one selected from the group consisting of Si, Ge, Ti, and Zr.

The second inorganic fluoride luminescent material obtained by the production method according to the present disclosure replaces hydroxide ions ($OH^-$) contained in the first inorganic fluoride luminescent material with fluoride ions ($F^-$) to reduce the content of hydroxide ions ($OH^-$), so that the element serving as the luminescent center is difficult to be reduced due to the influence of the hydroxide ions ($OH^-$), thereby maintaining excellent light emission characteristics. The components (for example, pyridine) contained in the non-aqueous hydrogen fluoride-containing liquid can be detected by nuclear magnetic resonance (proton NMR) by dissolving the obtained second inorganic fluoride luminescent material in a deuterated solvent.

As the second inorganic fluoride luminescent material obtained by the production method according to the present disclosure, for example, an inorganic fluoride fluorescent material having the composition represented by the formula (I) is activated by $Mn^{4+}$ to absorb light in the short wavelength region of visible light, thereby emitting red light. The excitation light, which is light in the short wavelength region of visible light, is preferably light mainly in the blue region. Specifically, the excitation light irradiated to the inorganic fluoride fluorescent material having the composition represented by the formula (I), as the second inorganic fluoride luminescent material, is preferably present in a range where the light emission peak wavelength of the light emission spectrum is 380 nm or more and 485 nm or less. The light emission spectrum of the inorganic fluoride fluorescent material having the composition represented by the formula (I) preferably has a peak wavelength in a range of 610 nm or more and 650 nm or less. The numerical value of the full width at half maximum of the light emission spectrum of the inorganic fluoride fluorescent material having the composition represented by the formula (I), as the second inorganic fluoride luminescent material, is preferably small, specifically 10 nm or less. The full width at half maximum refers to a full width at half maximum (FWHM) of the light emission peak in the light emission spectrum, and means a wavelength width of the light emission peak at 50% of the maximum value of the light emission peak in the light emission spectrum.

The inorganic fluoride fluorescent material having the composition represented by the formula (I), as the second inorganic fluoride luminescent material, can be used in a light emitting device to be used in illumination devices and backlight for liquid crystal display devices, in combination with an excitation light source such as an LED or LD.

As the excitation light source used in the light emitting device, an excitation light source that emits light in a wavelength range of 400 nm or more and 570 nm or less can be used. By using an excitation light source having the wavelength range, a light emitting device having high light emission intensity can be provided. The light emitting element to be used as the excitation light source for the light emitting device preferably has a light emission peak wavelength in a range of 420 nm or more and 500 nm or less, and more preferably in a range of 420 nm or more and 460 nm or less.

As the light emitting element, a semiconductor light emitting element using a nitride-based semiconductor ($In_XAl_YGa_{1-X-Y}N$, $0 \leq X$, $0 \leq Y$, $X+Y \leq 1$) is preferably used. By using a semiconductor light emitting element as the excitation light source for the light emitting device, a stable light emitting device having high efficiency, high output linearity with respect to input, and high resistance to mechanical impacts can be obtained. The full width at half maximum of the light emission spectrum of the light emitting element is preferably, for example, 30 nm or less.

The light emitting device may use an inorganic fluoride fluorescent material having a composition represented by, for example, the formula (I), as the second inorganic fluoride luminescent material. It may use an inorganic fluoride fluorescent material having a composition represented by, for example, the formula (I) as a first fluorescent material, and a second fluorescent material having a light emission peak wavelength different from that of the first fluorescent material. As the first fluorescent material, one type of fluorescent material may be used alone, and two or more types of fluorescent materials may be used in combination, as long as the fluorescent material has a light emission peak wavelength within a target wavelength range. As the second fluorescent material, one type of fluorescent material may be used alone, and two or more types of fluorescent materials may be used in combination, as long as the fluorescent material has a light emission peak wavelength within a target wavelength range.

Figure 2:
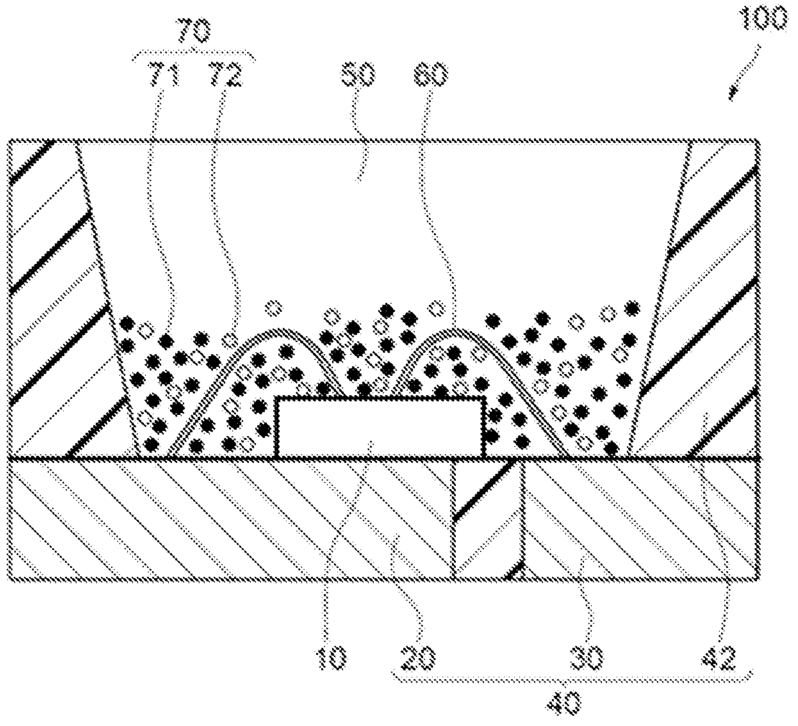
FIG. 2 is a schematic cross-sectional view showing an exemplary light emitting device using an inorganic fluoride fluorescent material.

An example of the light emitting device will be described with reference to the drawings. FIG. 2 is a schematic cross-sectional view showing an example of the light emitting device. The light emitting device is an example of a surface-mount light emitting device.

A light emitting device 100 includes a package 40 having a recessed portion formed by lead electrodes 20 and 30 and a molded body 40, a light emitting element 10, and a sealing member 50 that covers the light emitting element 10. The light emitting element 10 is arranged in the recessed portion of the package 40, and is electrically connected to the pair of positive and negative lead electrodes 20 and 30 provided in the package 40 via a conductive wire 60. The sealing member 50 is filled in the recessed portion to cover the light emitting element 10, and seals up the recessed portion of the package 40. The sealing member 50 contains, for example, a florescent material 70 that converts the wavelength of light emitted from the light emitting element 10, and a resin. The fluorescent material 70 contains a first fluorescent material 71 and a second fluorescent material 72. A part of the pair of positive and negative lead electrodes 20 and 30 is exposed on the outer surface of the package 40. The light emitting device 100 emits light by receiving electric power supplied from the outside through these lead electrodes 20 and 30.

The sealing member 50 contains a resin and a fluorescent material 70, and is formed to cover the light emitting element 10 arranged in the recessed portion of the light emitting device 100.

EXAMPLES

The present invention will be hereunder specifically described by reference to the following Examples. The present invention is not limited to these Examples.

Example 1

Step of Preparing First Inorganic Fluoride Luminescent Material

Potassium hexafluoromanganate ($K_2MnF_6$) in an amount of 0.99 g and hexafluorosilicic acid ($H_2SiF_6$) in an amount of 34.58 g were weighed and dissolved in 100 mL of an HF aqueous solution containing 55% by mass of hydrogen fluoride and 45% by mass of deionized water, and 100 mL of deionized water was further added to prepare a first aqueous solution.

Potassium hydrogen fluoride ($KHF_2$) in an amount of 15.6 g was weighed and dissolved in 50 mL of an HF aqueous solution containing 55% by mass of hydrogen fluoride and 45% by mass of deionized water to prepare a second aqueous solution.

Then, while stirring the first aqueous solution at room temperature, the second aqueous solution was dropped thereinto over approximately 10 minutes to obtain a precipitate. The resulting precipitate was subjected to solid-liquid separation, washed with ethanol, and dried at 110° C. for 8 hours to obtain a first inorganic fluoride fluorescent material having a composition represented by $K_2[Si_{0.958}Mn^{4+}{}_{0.042}F_6]$ as a first inorganic fluoride luminescent material. The Mn content (% by mass) in the first inorganic fluoride fluorescent material was 1.03% by mass.

Step of Preparing Non-Aqueous Hydrogen Fluoride-Containing Liquid

As the non-aqueous hydrogen fluoride-containing liquid, a pyridine-HF complex solution containing 70% by mass of hydrogen fluoride and 30% by mass of pyridine was prepared.

Step of Obtaining Non-Aqueous Solution

The first inorganic fluoride fluorescent material, as the first inorganic fluoride luminescent material, in an amount of 10.00 g was dissolved in 90 mL of the non-aqueous hydrogen fluoride-containing liquid to obtain a non-aqueous solution containing ions derived from the first inorganic fluoride luminescent material. The concentration of the first inorganic fluoride luminescent material (first inorganic fluoride fluorescent material) in the non-aqueous solution was 0.1 g/mL.

Step of Precipitating Second Inorganic Fluoride Luminescent Material

The non-aqueous solution containing ions derived from the first inorganic fluoride luminescent material in a batch-type reactor was adjusted to 25° C. and continuously stirred at 30 rpm using a mechanical stirrer, and acetonitrile, as the non-aqueous organic liquid, at approximately 25° C. was continuously dropped thereinto at a speed of 1 mL/min for 100 minutes using a tube-type metering pump (Pump 33, manufactured by Harvard Apparatus). Acetonitrile used as the non-aqueous organic liquid substantially contained no hydrogen fluoride, and had a hydrogen fluoride content of substantially 0% by mass. The volume ratio of the non-aqueous solution to the non-aqueous organic liquid was 1:1. The non-aqueous liquid mixture precipitated a precipitate. The resulting precipitate was subjected to solid-liquid separation, washed with acetonitrile, then washed with isopropanol, and vacuum dried at 25° C. for 8 hours to obtain a second inorganic fluoride fluorescent material of Example 1 having a composition represented by $K_2[Si_{0.962}Mn^{4+}{}_{0.038}F_6]$ as the second inorganic fluoride luminescent material. The Mn content (% by mass) in the second inorganic fluoride fluorescent material of Example 1 measured by the measurement method described below was 0.93% by mass. When the second inorganic fluoride fluorescent material of Example 1 was dissolved in a deuterated solvent and measured by nuclear magnetic resonance (proton NMR), pyridine, which was a component contained in the non-aqueous hydrogen fluoride-containing liquid, was detected from the second inorganic fluoride fluorescent material of Example 1.

Comparative Example 1

The first inorganic fluoride fluorescent material of Example 1, as the first inorganic fluoride luminescent material, was used as the inorganic fluoride luminescent material of Comparative Example 1. When the inorganic fluoride luminescent material of Comparative Example 1 was dissolved in a deuterated solvent and measured by nuclear magnetic resonance (proton NMR), pyridine was not contained in the inorganic fluoride luminescent material of Comparative Example 1 (0 ppm by mass of pyridine).

Evaluation and Result 1

Infrared Reflection Spectrum

Figure 3:
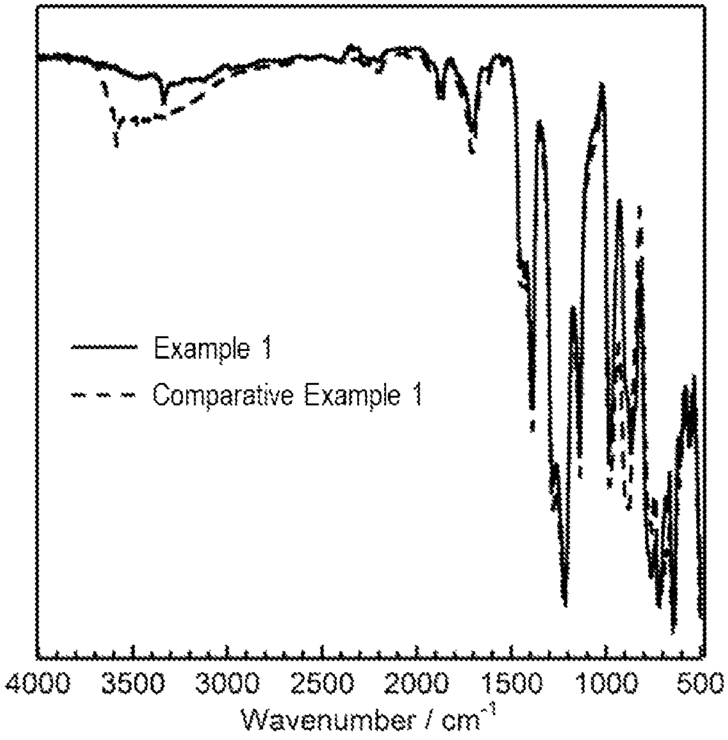
FIG. 3 is an exemplary graph showing infrared reflection spectra of inorganic fluoride fluorescent materials according to Example 1 and Comparative Example 1.

The infrared reflection spectrum in each of the inorganic fluoride fluorescent materials was measured by a diffuse reflection method using a Fourier transform infrared spectrophotometer (FT/IR-6600, manufactured by JASCO corp.). FIG. 3 shows the infrared reflection spectra of the second inorganic fluoride fluorescent material according to Example 1 and the first inorganic fluoride fluorescent material according to Comparative Example 1.

Evaluation and Result 2

Mn Content and Internal Quantum Efficiency

The Mn content (% by mass) in each of the inorganic fluoride fluorescent materials was measured using a high-frequency inductively coupled plasma (ICP) light emission spectrophotometer (PS3500DD-II, manufactured by Hitachi High-Tech Science Corp.). Further, using a quantum efficiency measuring apparatus (QE-2100, manufactured by Otsuka Electronics Co., Ltd.), each inorganic fluoride fluorescent material was excited by excitation light having a light emission peak wavelength of 450 nm to measure the light emission spectrum, and the internal quantum efficiency of the light emission of each inorganic fluoride fluorescent material was measured from the light emission spectrum in a range of 600 nm or more and 650 nm or less.

TABLE 1

| | Internal quantum efficiency (IQE) (%) |
|---|---|
| Example 1 | 94.1 |
| Comparative Example 1 | 88.6 |

In the second inorganic fluoride fluorescent material according to Example 1, the decrease in the infrared reflection spectrum was suppressed in a wavenumber region from 2,500 to 4,000 $cm^{-1}$, compared with the first inorganic fluoride luminescent material according to Comparative Example 1. The decrease in the infrared reflection spectrum in the wavenumber region from 2,500 to 4,000 $cm^{-1}$ indicated the presence of hydroxide ions ($OH^-$) or water, and the suppression of the decrease in the infrared reflection spectrum in the wavenumber region from 2,500 to 4,000 $cm^{-1}$ indicated that the second inorganic fluoride fluorescent material according to Example 1 contained less hydroxide ions ($OH^-$) or water. The second inorganic fluoride fluorescent material according to Example 1 had less hydroxide ions ($OH^-$) and water than the first inorganic fluoride fluorescent material according to Comparative Example 1, which suppressed the decrease in optical characteristics due to hydroxide ions ($OH^-$) or water.

The second inorganic fluoride fluorescent material according to Example 1 had less hydroxide ions ($OH^-$) and water, and the tetravalent manganese, which was the luminescent center, was maintained without being reduced to trivalent. Therefore, the second inorganic fluoride fluorescent material according to Example 1 had higher internal quantum efficiency than that of the first inorganic fluoride fluorescent material according to Comparative Example 1, and had excellent light emission characteristics.

Evaluation and Result 3

Ultraviolet Visible Reflection Spectrum

Figure 4:
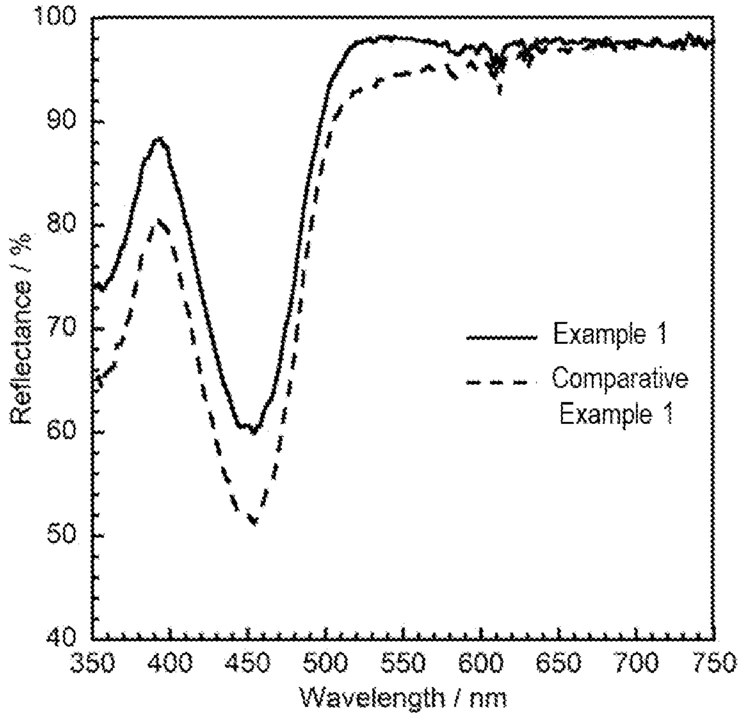
FIG. 4 is an exemplary graph showing ultraviolet visible reflection spectra of inorganic fluoride fluorescent materials according to Example 1 and Comparative Example 1.

The ultraviolet visible reflection spectrum in each of the inorganic fluoride fluorescent materials was measured using an ultraviolet visible near-infrared spectrophotometer (U-4100, manufactured by Hitachi High-Tech Science Corp.). FIG. 4 shows the ultraviolet visible reflection spectra of the second inorganic fluoride fluorescent material according to Example 1 and the first inorganic fluoride fluorescent material according to Comparative Example 1.

It was confirmed that the ultraviolet visible reflection spectrum of the second inorganic fluoride fluorescent material according to Example 1 had higher reflectance in a wavelength range from 500 to 600 nm than that of the ultraviolet visible reflection spectrum of the first inorganic fluoride fluorescent material according to Comparative Example 1. In the ultraviolet visible reflection spectrum of the second inorganic fluoride fluorescent material according to Example 1, the decrease in the reflectance in the ultraviolet visible reflection spectrum in the wavelength range from 500 to 600 nm indicated the presence of $Mn^{3+}$ not contributing to light emission. The ultraviolet visible reflection spectrum of the second inorganic fluoride fluorescent material according to Example 1 had higher reflectance in the wavelength range from 500 to 600 nm than that of the ultraviolet visible reflection spectrum of the first inorganic fluoride fluorescent material according to Comparative Example 1. This indicated that the amount of $Mn^{3+}$ not contributing to light emission was small, and the amount of $Mn^{4+}$ contributing to light emission was large, relatively. From the ultraviolet visible reflection spectrum of the second inorganic fluoride fluorescent material according to Example 1, the second inorganic fluoride fluorescent material according to Example 1 had less $Mn^{3+}$ not contributing to light emission and relatively more $Mn^{4+}$ contributing to light emission than the first inorganic fluoride fluorescent material according to Comparative Example 1, and had excellent light emission characteristics.

Evaluation and Results 4 and 5

Excitation Spectrum and Light Emission Spectrum

Figure 5:
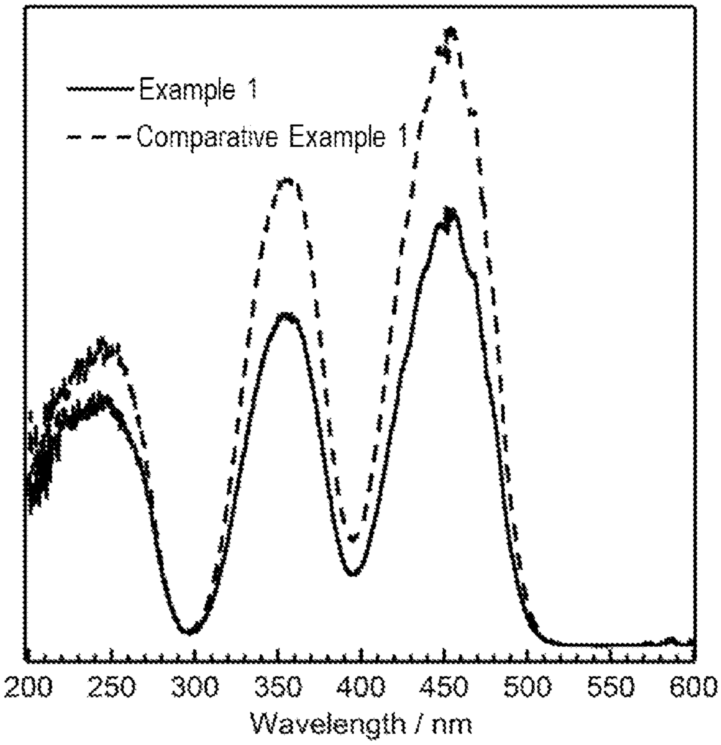
FIG. 5 is an exemplary graph showing excitation spectra of inorganic fluoride fluorescent materials according to Example 1 and Comparative Example 1.
Figure 6:
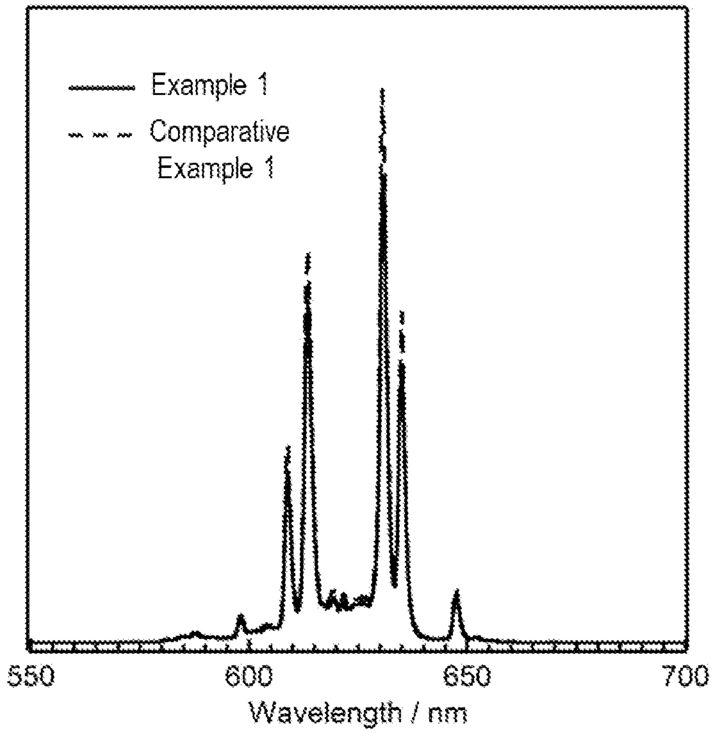
FIG. 6 is an exemplary graph showing light emission spectra of inorganic fluoride fluorescent materials according to Example 1 and Comparative Example 1.

The excitation spectrum and the light emission spectrum in each of the fluoride fluorescent materials were measured using a spectrofluorophotometer (FP-8500DS, manufactured by JASCO corp.). FIG. 5 shows the excitation spectra of the second inorganic fluoride fluorescent material according to Example 1 and the first inorganic fluoride fluorescent material according to Comparative Example 1. FIG. 6 shows the light emission spectra of the second inorganic fluoride fluorescent material according to Example 1 and the first inorganic fluoride fluorescent material according to Comparative Example 1.

It was confirmed that the second inorganic fluoride fluorescent material according to Example 1 and the first inorganic fluoride fluorescent material according to Comparative Example 1 each had peaks in the excitation spectrum at 350 nm and 450 nm, and high absorption of excitation light at approximately the same wavelengths.

The second inorganic fluoride fluorescent material according to Example 1 and the first inorganic fluoride fluorescent material according to Comparative Example 1 each had approximately the same light emission spectrum and a sharp emission spectrum with a narrow full width at half maximum.

INDUSTRIAL APPLICABILITY

The inorganic fluoride luminescent materials obtained by the production method of the present disclosure can be used as fiber lasers, laser media for fiber amplifiers, and fluorescent materials. Among the inorganic fluoride luminescent materials obtained by the production method of the present disclosure, the inorganic fluoride fluorescent material can be suitably used in various applications such as illumination light sources using a light emitting diode as an excitation light source, light sources for LED displays or liquid crystal backlight applications, traffic signals, illumination switches, various sensors, various indicators, and small strobes.

EXPLANATIONS OF LETTERS OR NUMERALS

10: Light emitting element, 20, 30: Lead electrodes, 40: Package, 42: Molded body, 50: Sealing member, 60: Wire, 70: Fluorescent material, 71: First fluorescent material. 72: Second fluorescent material, and 100: Light emitting device.

What is claimed is:

1. A method for producing an inorganic fluoride luminescent material comprising:

bringing a first inorganic fluoride luminescent material and a non-aqueous hydrogen fluoride-containing liquid having a hydrogen fluoride content in a range of 20% by mass or more and 100% by mass or less into contact with each other to obtain a non-aqueous solution containing ions derived from the first inorganic fluoride luminescent material; and bringing the non-aqueous solution and a non-aqueous organic liquid having a hydrogen fluoride content of less than 20% by mass into contact with each other to precipitate a second inorganic fluoride luminescent material.

2. The method for producing an inorganic fluoride luminescent material according to claim 1, wherein the non-aqueous hydrogen fluoride-containing liquid comprises at least one selected from the group consisting of nitrogen-containing heterocyclic compounds, amines, ureas, amides, carbamic acids, trialkylphosphines, ethers, esters, alcohols, and quaternary ammonium salts.

3. The method for producing an inorganic fluoride luminescent material according to claim 1, wherein the non-aqueous organic liquid comprises at least one selected from the group consisting of nitriles, ketones, amines, amides, nitrogen-containing heterocyclic compounds, fluoro-compounds, ethers, esters, alcohols, and mixtures of these.

4. The method for producing an inorganic fluoride luminescent material according to claim 1, wherein the non-aqueous solution has a concentration of the first inorganic fluoride luminescent material in a range of 0.01 g/mL or more and 1.0 g/mL or less.

5. The method for producing an inorganic fluoride luminescent material according to claim 1, wherein in the step of precipitating the second inorganic fluoride luminescent material, the temperature of the non-aqueous solution is in a range of 10° C. or higher and 40° C. or lower, the temperature of the non-aqueous organic liquid is in a range of 10° C. or higher and 40° C. or lower, and the temperature difference between the temperature of the non-aqueous solution and the temperature of the non-aqueous organic liquid is less than 10° C.

6. The method for producing an inorganic fluoride luminescent material according to claim 1, wherein in the step of precipitating the second inorganic fluoride luminescent material, the volume ratio of the non-aqueous solution to the non-aqueous organic liquid is 1:1 to 5:1.

7. The method for producing an inorganic fluoride luminescent material according to claim 1, wherein in the step of precipitating the second inorganic fluoride luminescent material, while continuously stirring the non-aqueous solution, the non-aqueous organic liquid is dropped thereinto to precipitate the second inorganic fluoride luminescent material.

8. The method for producing an inorganic fluoride luminescent material according to claim 7, wherein in the step of precipitating the second inorganic fluoride luminescent material, the stirring speed of the non-aqueous solution is in a range of 20 to 1,000 rpm.

9. The method for producing an inorganic fluoride luminescent material according to claim 7, wherein in the step of precipitating the second inorganic fluoride luminescent material, the dropping speed of the non-aqueous organic liquid is in a range of 0.1 mL/min or more and 10 mL/min or less.

10. The method for producing an inorganic fluoride luminescent material according to claim 1, wherein the second inorganic fluoride luminescent material comprises a composition represented by the following formula (I):

$$Ax[M1-zMn4+zFy] \quad (I)$$

wherein A represents at least one ion selected from the group consisting of Li+, Na+, K+, Rb+, Cs+, and NH4+; M represents at least one element selected from the group consisting of Group 4 elements and Group 14 elements; x is an absolute value of an electric charge of the [M1-zMn4+zFy] ion; and y and z satisfy 5≤y≤7 and 0<z<0.2, respectively.

* * * * *